United States Patent
Terada

(10) Patent No.: US 8,054,523 B2
(45) Date of Patent: Nov. 8, 2011

(54) OPTICAL REFLECTION DEVICE

(75) Inventor: Jirou Terada, Osaka (JP)

(73) Assignee: Panasonic Corporation, Osaka (JP)

( * ) Notice: Subject to any disclaimer, the term of this patent is extended or adjusted under 35 U.S.C. 154(b) by 455 days.

(21) Appl. No.: 12/304,004

(22) PCT Filed: Jul. 20, 2007

(86) PCT No.: PCT/JP2007/064332
§ 371 (c)(1),
(2), (4) Date: Dec. 9, 2008

(87) PCT Pub. No.: WO2008/015922
PCT Pub. Date: Feb. 7, 2008

(65) Prior Publication Data
US 2010/0245956 A1 Sep. 30, 2010

(30) Foreign Application Priority Data
Aug. 1, 2006 (JP) .................. 2006-209659

(51) Int. Cl.
*G02B 26/08* (2006.01)
*G02B 26/10* (2006.01)
*G02B 26/12* (2006.01)

(52) U.S. Cl. ............... 359/224.1; 359/225.1; 359/226.2

(58) Field of Classification Search .... 359/198.1–199.4, 359/200.6–200.8, 202.1, 221.2, 223.1–225.1, 359/226.2, 290–295, 838, 846, 871–872; 250/204, 559.06, 559.29, 230, 234; 347/225–260; 353/39, 98–99; 385/15–18, 22; 398/12, 398/19, 45
See application file for complete search history.

(56) References Cited

U.S. PATENT DOCUMENTS

| | | | |
|---|---|---|---|
| 5,701,192 A * | 12/1997 | Ji et al. | ............ 359/224.1 |
| 6,222,302 B1 | 4/2001 | Imada et al. | |
| 7,136,215 B1 * | 11/2006 | Machida et al. | ............ 359/295 |
| 2006/0198006 A1* | 9/2006 | Kato et al. | ............ 359/224 |

FOREIGN PATENT DOCUMENTS

| | | |
|---|---|---|
| JP | 63-45525 | 3/1988 |
| JP | 9-185000 | 7/1997 |
| JP | 11-168246 | 6/1999 |
| JP | 11-281908 | 10/1999 |
| JP | 2006-138913 | 6/2006 |
| JP | 2006138913 A * | 6/2006 |

OTHER PUBLICATIONS

International Search Report issued Aug. 21, 2007 in the International (PCT) Application of which the present application is the U.S. National Stage.
English translation of JP 2006-138913, Jun. 2006.
Partial English translation of JP 63-045525, Mar. 1988.

* cited by examiner

*Primary Examiner* — Stephone Allen
*Assistant Examiner* — Kimberly N Kakalec
(74) *Attorney, Agent, or Firm* — Wenderoth, Lind & Ponack, L.L.P.

(57) ABSTRACT

An optical reflection device includes a flexible substrate, an elastic portion connected with an end of the flexible substrate, an optical reflector coupled with the flexible substrate via the elastic portion, a first electrode layer provided on the flexible substrate, and a piezoelectric layer provided on the first electrode layer. The optical reflection device may have a small size.

12 Claims, 9 Drawing Sheets

OPTICAL REFLECTION DEVICE

TECHNICAL FIELD

This invention relates to an optical reflection device used for a device including a photo sensitive element, such as a laser printer or a photocopier.

BACKGROUND ART

FIG. 16 is a top view of conventional optical reflection device 501. Optical reflection device 501 includes polygon mirror 11 having a polygonal shape. Rotating about rotation axis 11A, polygon mirror 11 reflects a laser beam emitted from laser emitter 12 on reflection surface 11B, sweeping the laser beam on scanning surface 13 of a photosensitive drum of a laser printer.

This type of conventional optical reflection device is disclosed in Patent JP11-281908.

Polygon mirror 11 having the polygonal shape has a certain thickness from the rotation axis, hence preventing optical reflection device 501 from having a small size.

SUMMARY OF THE INVENTION

An optical reflection device includes a flexible substrate, an elastic portion connected with an end of the flexible substrate, an optical reflector coupled with the flexible substrate via the elastic portion, a first electrode layer provided on the flexible substrate, and a piezoelectric layer provided on the first electrode layer.

The optical reflection device may have a small size.

DETAILED DESCRIPTION OF PREFERRED EMBODIMENT

Figure 7:
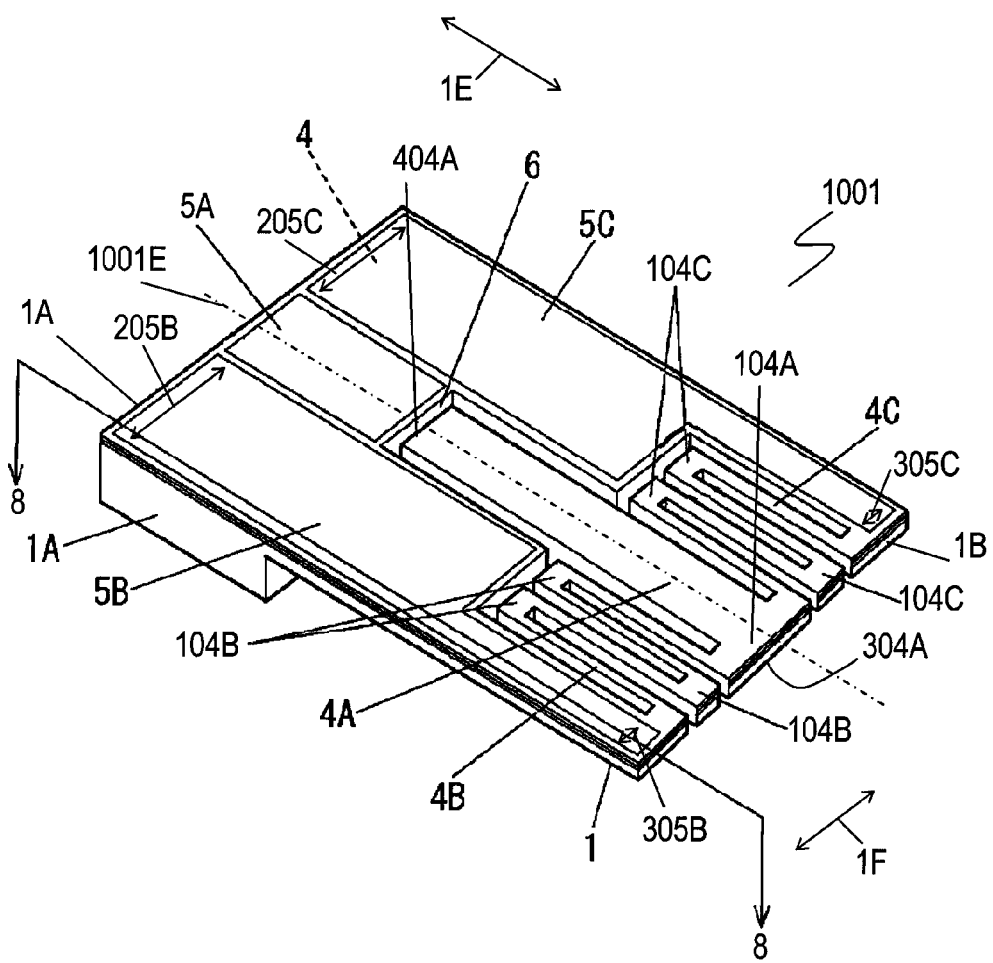
FIG. 7 is a perspective view of the optical reflection device according to the embodiment.
Figure 8:
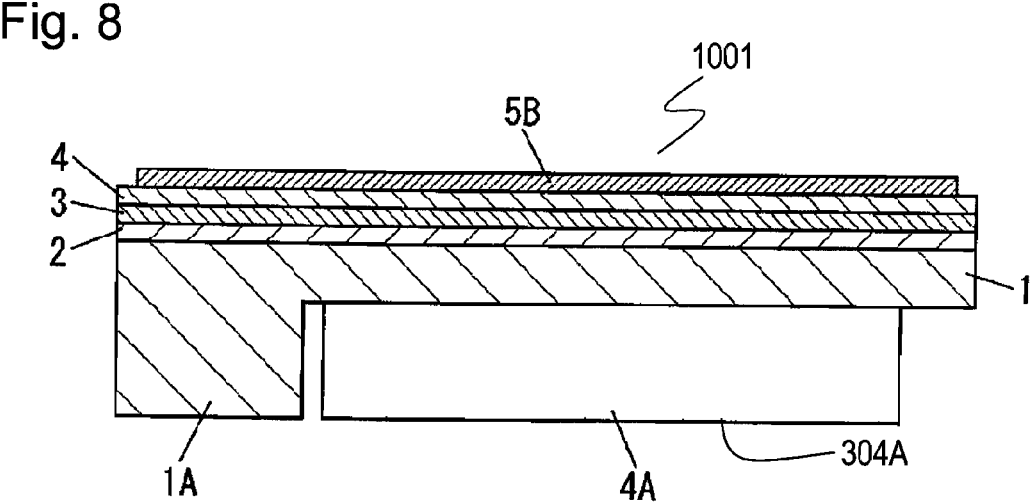
FIG. 8 is a cross-sectional view of the optical reflection device according to the embodiment.

FIGS. 1 to 6 are perspective views of optical reflection device 1001 according to an exemplary embodiment of the present invention for illustrating processes for manufacturing the device. FIG. 7 is a perspective view of optical reflection device 1001. FIG. 8 is a cross-sectional view of optical reflection device 1001 at line 8-8 shown in FIG. 7.

Figure 1:
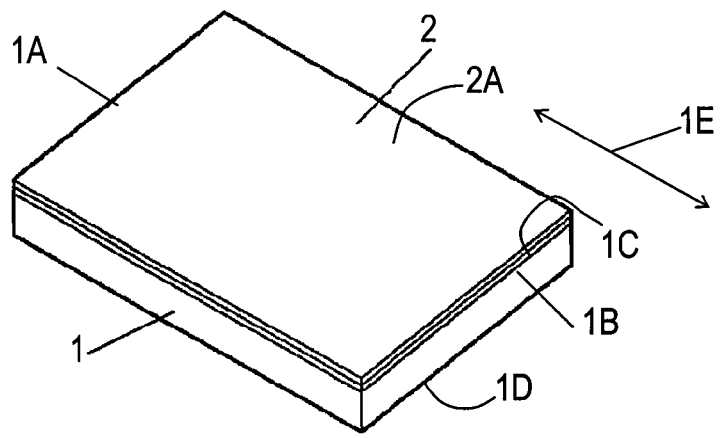
FIG. 1 is a perspective view of an optical reflection device according to an exemplary embodiment of the present invention for illustrating a process for manufacturing the device.

First, as shown in FIG. 1, flexible substrate 1 has first end 1A and second end 1B opposite to each other in first direction 1E. Flexible substrate 1 is made of silicon and has an insulating property. Flexible substrate 1 has upper surface 1C and lower surface 1D opposite to upper surface 1C. Upper surface 1C of flexible substrate 1 is oxidized by heat processing, forming oxide film 2 entirely on upper surface 1C.

Figure 2:
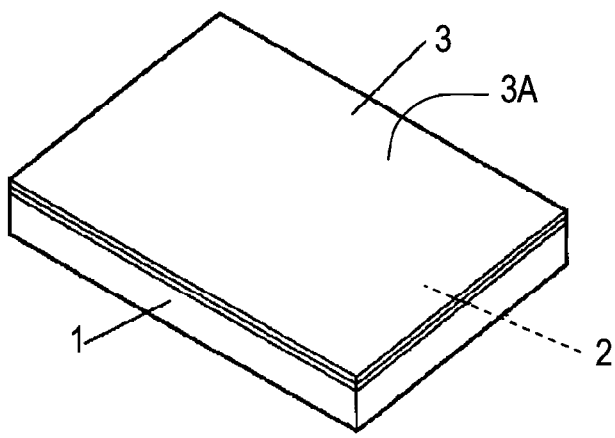
FIG. 2 is a perspective view of the optical reflection device according to the embodiment for illustrating a process for manufacturing the device.

Next, as shown in FIG. 2, first electrode layer 3 is formed entirely on upper surface 2A of oxide film 2 by sputtering or vaporizing metal conductive material, such as platinum.

Figure 3:
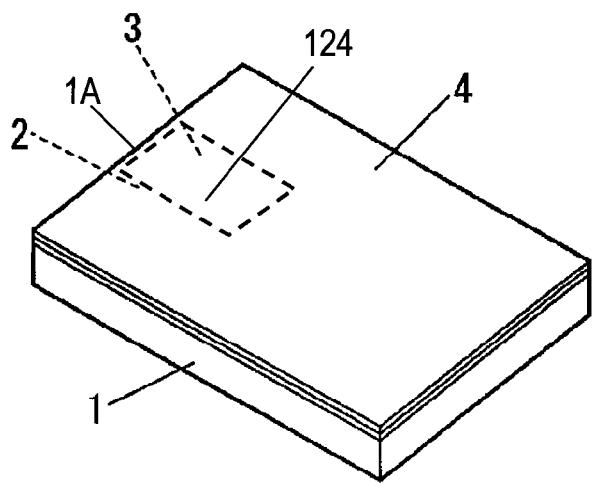
FIG. 3 is a perspective view of the optical reflection device according to the embodiment for illustrating a process for manufacturing the device.

Then, as shown in FIG. 3, piezoelectric layer 4 is formed entirely on upper surface 3A of first electrode layer 3 by sputtering or vaporizing piezoelectric material, such as lead zirconate titanate (PZT).

Figure 4:
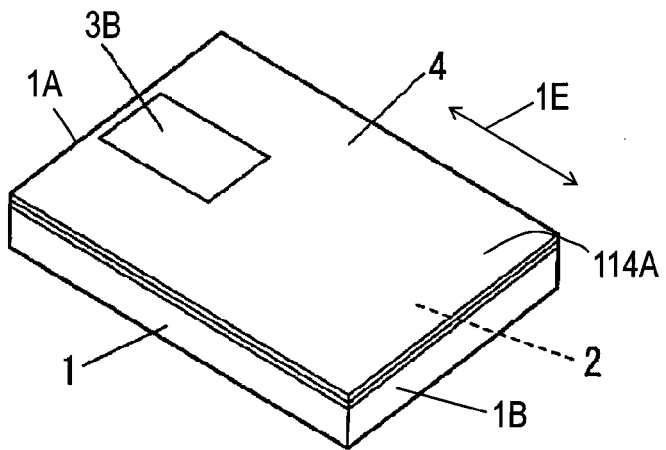
FIG. 4 is a perspective view of the optical reflection device according to the embodiment for illustrating a process for manufacturing the device.

Then, as shown in FIG. 4, portion 124 of piezoelectric layer 4 near first end 1A of flexible substrate 1 is removed by Micro Electro Mechanical System (MEMS) processing so as to expose portion 3B of electrode layer 3.

Figure 5:
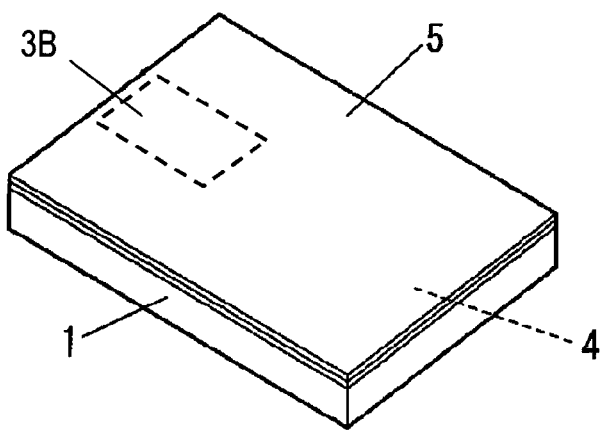
FIG. 5 is a perspective view of the optical reflection device according to the embodiment for illustrating a process for manufacturing the device.

Then, as shown in FIG. 5, conductive layer 5 is, formed entirely on portion 3B and entirely on upper surface 114A of piezoelectric layer 4 by sputtering or vaporizing metal conductive material, such as gold.

Figure 6:
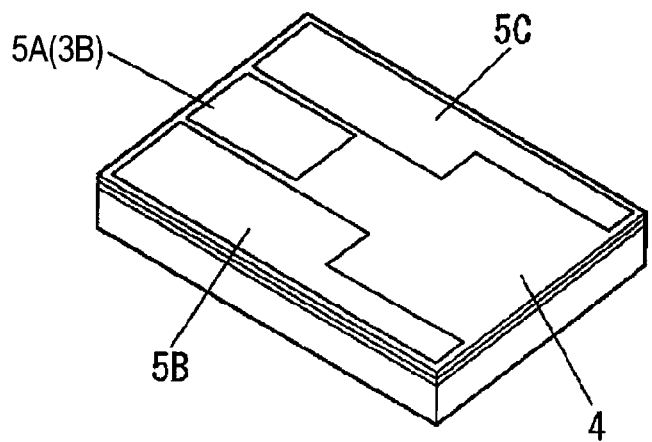
FIG. 6 is a perspective view of the optical reflection device according to the embodiment for illustrating a process for manufacturing the device.

Then, as shown in FIG. 6, a portion of conductive layer 5 is removed by MEMS processing to expose piezoelectric layer 4, such that lead-out electrode 5A, second electrode layer 5B, and third electrode layer 5C. Lead-out electrode 5A is located on portion 3B of first electrode layer 3. Second electrode layer 5B and third electrode layer 5C are located on piezoelectric layer 4 at both sides of lead-out electrode 5A.

Then, as shown in FIG. 7, slit 6 is formed in silicon substrate 1 from end 1B to first end 1A by etching. This process provides optical reflector 4A, first elastic portion 4B, and second elastic portion 4C. Elastic portions 4B and 4C have zigzag shapes extending from second end 1B toward first end 1A of substrate 1 and returning while the zigzag shapes proceed in second direction 1F perpendicular to first direction 1E. End portion 104A of optical reflector 4A is connected to elastic portions 4B and 4C to be supported by portions 4B and 4C. Optical reflector 4A is provided between end portion 1A and end portion 104A, i.e., second end 1B. End portion 104A of optical reflector 4A is connected to second end 1B of flexible substrate 1 via first elastic portion 4B and connected to second end 1B of flexible substrate 1 via second elastic portion 4C.

Figure 9:
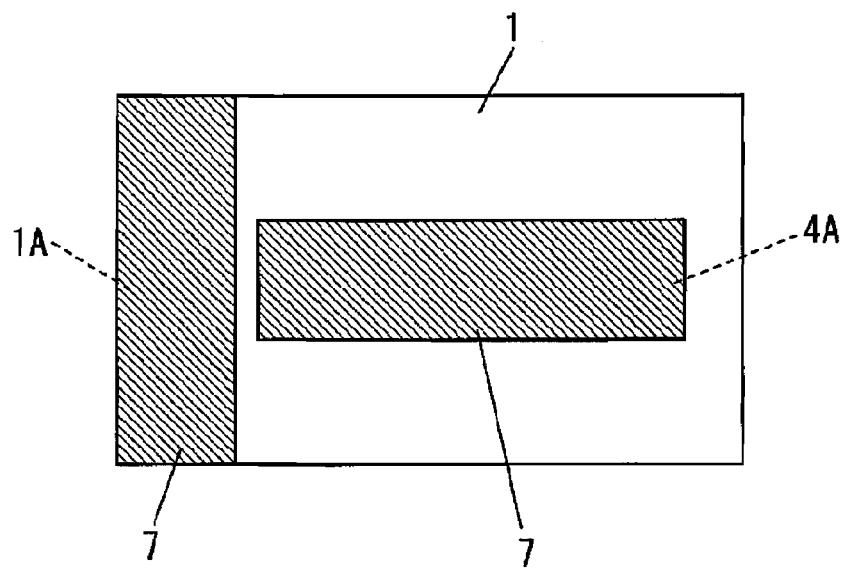
FIG. 9 is a bottom view of the optical reflection device according to the embodiment for illustrating a process for manufacturing the device.

FIG. 8 is a cross sectional view of optical reflection device 1001 at line 8-8 shown in FIG. 7. FIG. 9 is a bottom view of optical reflection device 1001 for illustrating a process for manufacturing the device. Mask 7 is formed on first end 1A of lower surface 1D of flexible substrate 1 and on optical reflector 4A, and then, the substrate is etched to allow elastic portions 4B and 4C to be thinner than first end 1A and optical reflector 4A, as shown in FIG. 8. This arrangement increases elasticity of elastic portion 4B and 4C. Surface 304A of optical reflector 4A of flexible substrate 1 is a mirror surface reflecting light. Lead wires connected with lead-out electrode 5A, second electrode layer 5B, and third electrode layer 5C can be arbitrarily arranged to face optical reflector 4A. Optical reflector 4A is thicker than elastic portions 4B and 4C, and can hardly warp, accordingly reducing a distortion of an image produced with light reflected on surface 304A.

An operation of optical reflection device 1001 will be described below.

Upon an alternate current (AC) voltage being applied between lead-out electrode 5A and second electrode layer 5B in FIG. 7, the AC voltage is applied between second electrode layer 5B and first electrode layer 3 electrically connected to lead-out electrode 5A. This voltage causes piezoelectric layer 4 sandwiched between first electrode layer 3 and second electrode layer 5B to warp due to its piezoelectric effect. As the polarity of the voltage is inverted between first electrode layer 3 and second electrode layer 5B, a warping direction of piezoelectric layer 4 is reversed. This produces a primary vibration of piezoelectric layer 4 about first end 1A as a fulcrum, thereby causing optical reflection device 1001 to vibrate.

Figure 10:
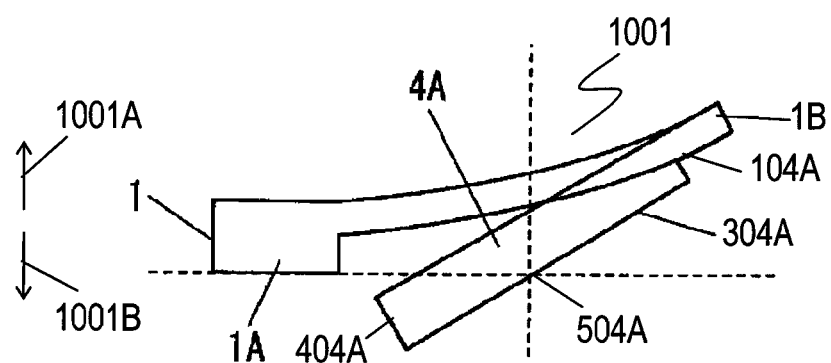
FIG. 10 is a side view of the optical reflection device operating according to the embodiment.
Figure 11:
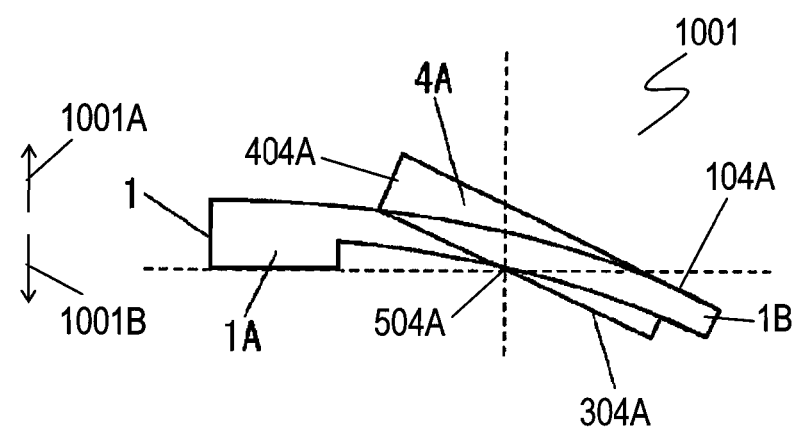
FIG. 11 is a side view of the optical reflection device operating according to the embodiment.

FIGS. 10 and 11 are side views of oscillating optical reflection device 1001. As shown in FIG. 10, when flexible substrate 1 warps about first end 1A as a fulcrum in direction 1001A toward which upper surface 1C is directed, optical reflector 4A protrudes due to its inertia force about second end 1B as a fulcrum in direction 1001B toward which surface 304A is directed. On the other hand, as shown in FIG. 11, when flexible substrate 1 warps in direction 1001B about first end 1A as a fulcrum, optical reflector 4A protrudes in direction 100A about second 1B of substrate 1 as a fulcrum. Although end portion 104A of optical reflector 4A is connected with second end 1B of flexible substrate 1, end portion 104A of optical reflector 4A and end portion 404A opposite end portion 104A are both displaceable with respect to first end 1A of flexible substrate 1 since flexible substrate 1 itself is displaceable with respect to first end 1A.

Figure 12:
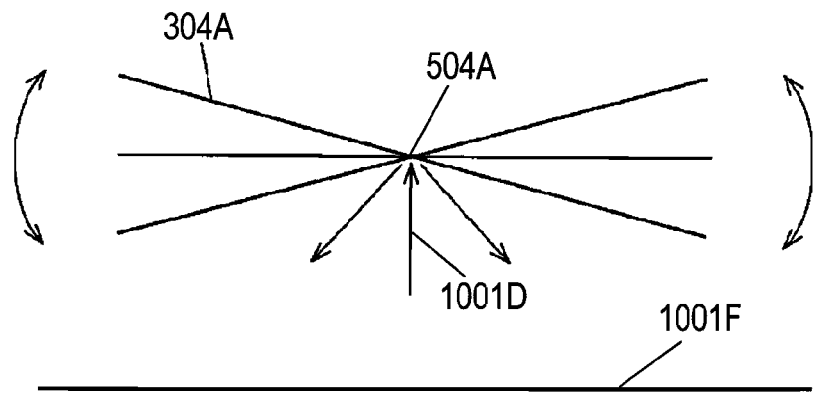
FIG. 12 is a schematic diagram of the optical reflection device operating according to the embodiment.

FIG. 12 is a schematic diagram of surface 304A of oscillating optical reflector 4A, the mirror surface reflecting light. Surface 304A, the mirror surface, of optical reflector 4A causes a mechanical resonance so that undisplaceable point 504A is produced at the center of the surface. Laser beam 1001D emitted by a laser emitter is received at undisplaceable point 504A of surface 304A and reflected at undisplaceable point 504A. The laser beam forms an image without distortion on scanning surface 1001F, such as a photosensitive drum of a printer. Thus, optical reflection device 1001 without a polygonal mirror is provided.

As shown in FIG. 7, first elastic portion 4B and second elastic portion 4C are preferably located at positions symmetrical to each other with respect to center line 1001E along first direction 1E of optical reflector 4A, preferably have shapes symmetrically to each other with respect to center line 1001E. This structure prevents optical reflector 4A from rolling about center line 1001F, allowing the reflected laser beam to scan linearly.

Figure 13:
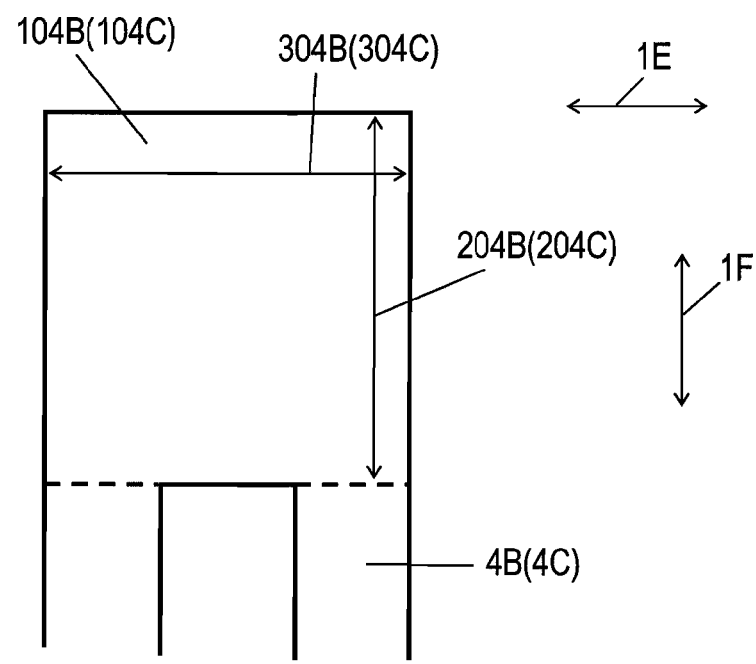
FIG. 13 is an enlarged view of the optical reflection device according to the embodiment.

FIG. 13 is an enlarged view of first elastic portion 4B and second elastic portion 4C having the zigzag shapes proceeding in second direction 1F perpendicular to first direction 1E. The zigzag shapes of first elastic portion 4B and second elastic portion 4C return at first end portion 104B and second end portion 104C, respectively. Width 304B and 304C of first end portion 104B of first elastic portion 4B and second end portion 104O of second elastic portion 4C in second direction 1F are preferably shorter than width 204B and 204C of first direction 1E. This structure prevents optical reflector 4A from rolling about center line 1001E, allowing the reflected laser beam to scan linearly.

As shown in FIG. 7, second electrode layer 5B and third electrode layer 5C are preferably located at positions symmetrical to each other with respect to center line 1001E of optical reflector 4A, and preferably have shapes symmetrical to each other figure with respect to center line 1001E.

In the case that second electrode layer 5B and third electrode layer 5C are made of the same material, the layers have the same resonant frequency as long as the layers have the same shape and the same size. Therefore, first elastic portion 4B and second elastic portion 4C may resonate and vibrate at the same frequency. This prevents optical reflector 4A from rolling about center line 1001E, allowing the reflected laser beam to scan linearly.

Second electrode layer 5B and third electrode layer 5C are located at positions symmetrical to each other with reference to center line 1001E of optical reflector 4A, and have shapes symmetrical to each other with reference to center line 1001E. This arrangement allows optical reflector 4A to receive powers substantially identical to each other in a direction perpendicular to center line 1001E. This prevents optical reflector 4A from rolling about center line 1001E, allowing the reflected laser beam to scan linearly.

Figure 14:
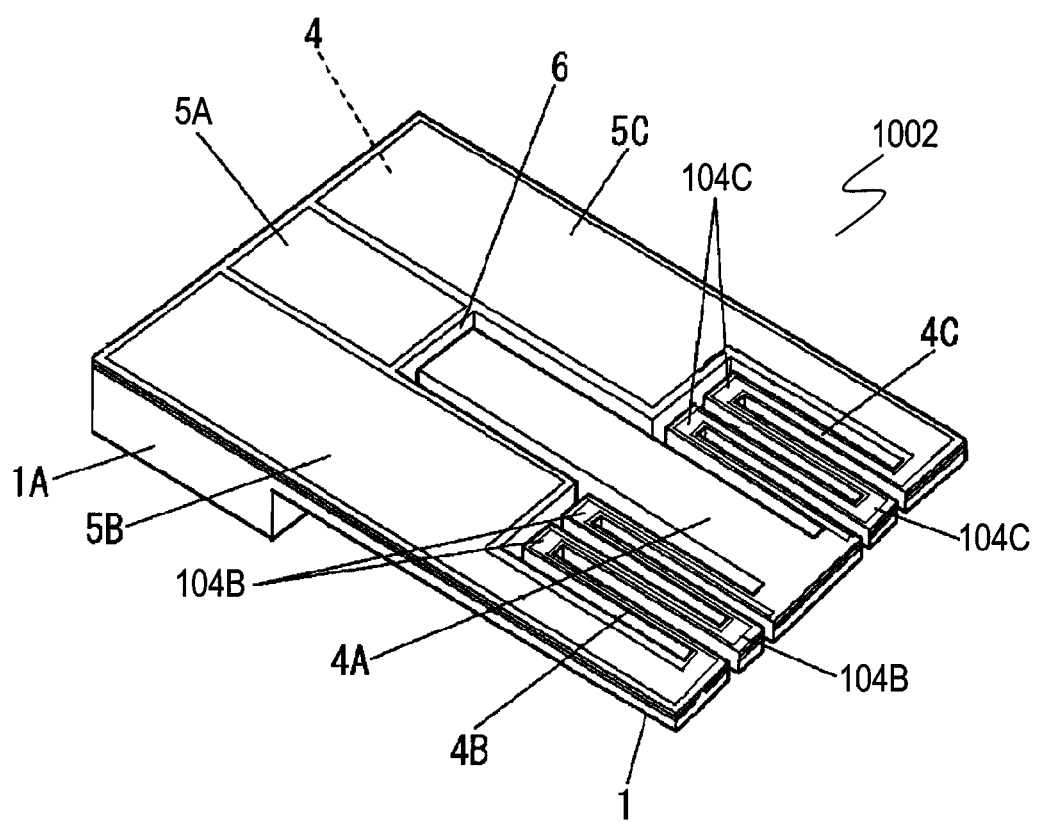
FIG. 14 is a perspective view of another optical reflection device according to the embodiment.

FIG. 14 is a perspective view of another optical reflection device 1002 according to the embodiment. In FIG. 14, components identical to those of optical reflection device 1001 shown in FIG. 7 are denoted by the same reference numerals, and their description will be omitted. In optical reflection device 1001 shown in FIG. 7, first electrode layer 3 extends onto first elastic portion 4B and onto second elastic portion 4C. In optical reflection device 1002, second electrode layer 5B and third electrode layer 5C face first elastic portion 4B and second elastic portion 4C, respectively, across piezoelectric layer 4 and first electrode layer 3. This structure causes elastic portion 4B and 4C to warp largely, and increases an amplitude of the vibration of optical reflector 4A.

Figure 15:
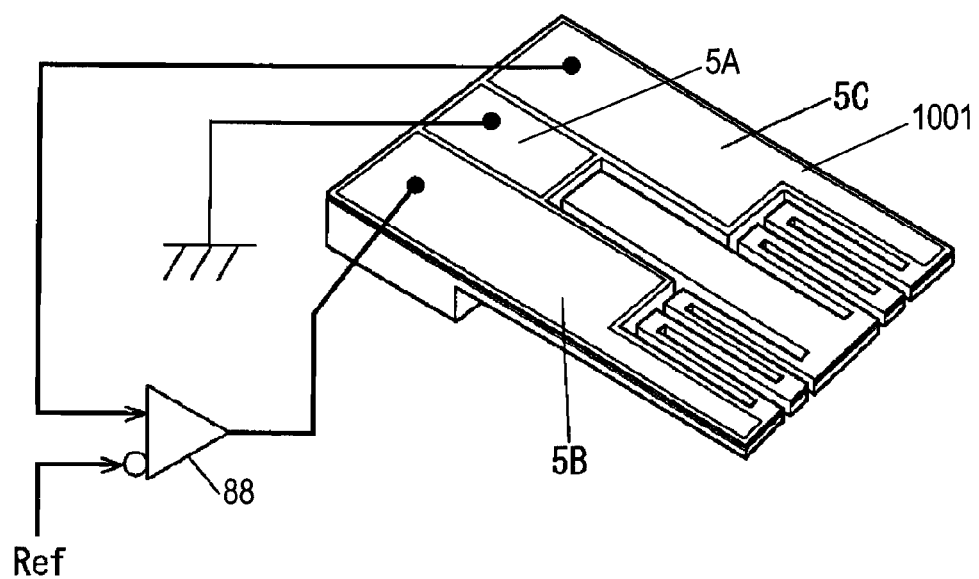
FIG. 15 is a schematic view of the optical reflection device according to the embodiment for illustrating a method for controlling the device.
Figure 16:
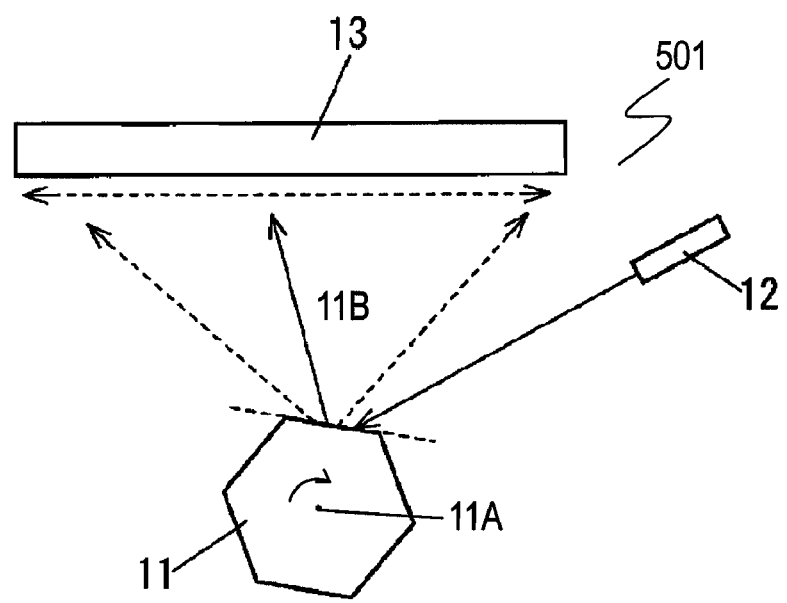
FIG. 16 is a top view of a conventional optical reflection device.

Then, a method of controlling optical reflection device 1001 will be explained. FIG. 15 is a schematic view of optical reflection device 1001 for illustrating a method of controlling optical reflection device 1001. As described above, a predetermined voltage is applied between second electrode layer 5B and third electrode layer 5C to cause piezoelectric layer 4 to warp, allowing optical reflector 4A to resonate mechanically. A Q-factor, i.e., a sharpness of this resonance is determined to be higher than 100 to apply the voltage to only second electrode layer 5B out of second electrode layer 5B and third electrode layer 5C to cause optical reflector 4A to vibrate. A signal corresponding to the oscillation is detected from third electrode layer 5C.

An operation of the device will be explained in detail below. A predetermined AC voltage is applied between electrode layer 5B and lead-out electrode 5A, i.e., first electrode layer 3, and a portion of piezoelectric layer 4 between second electrode layer 5B and first electrode layer 3 accordingly warp due to a piezoelectric effect, thereby causing silicon substrate 1 to vibrate by a predetermined amplitude at a predetermined frequency. This vibration produces an electric charge between third electrode layer 5C of piezoelectric layer 4 and first electrode layer 3 due to the piezoelectric effect. The electric charge is output and detected by third electrode layer 3C as a detected signal. If the amplitude of the vibration becomes small, the amount of the electric charge produced at piezoelectric layer 4 becomes small accordingly. The amount of the electric charge is input to comparator 88 as a detected signal. If the amount of the electric charge becomes smaller than reference value Ref, comparator 88 outputs a signal to raise the voltage applied to second electrode layer 5B for feedback. If the amplitude of the vibration becomes large, the amount of the electric charge produced at piezoelectric layer 4 becomes large. If the amount of the electric charge becomes larger than reference value Ref, comparator 88 outputs a signal to decrease the voltage applied to second electrode layer 5B for feedback. Thereby, the amplitude of the vibration of optical reflector 4A is maintained to be constant.

The widths of second electrode layer 5B and third electrode layer 5C in second direction 1F may be constant along first direction 1E. As shown in FIG. 7, widths 205B and 205C of sides of second electrode layer 5B and third electrode layer 5C approximating to first end 1A are preferably large in second direction 1F. Widths of sides of second electrode layer 5B and third electrode layer 5C approximating to second end 1B are preferably shorter than widths 305B and 305C in second direction 1F. This structure allows optical reflection device 1001 to be stably held, and increases the amplitude of the vibration of optical reflector 4A.

As shown in FIGS. 7 and 8, second electrode layer 5B and third electrode layer 5C are provided preferably within an effective length of the electrodes of piezoelectric layer 4, that is, layers 5B and 5C preferably face first electrode layer 3 across piezoelectric layer 4. This arrangement reduces spurious caused by the vibration of piezoelectric layer 4. On the contrary, if second electrode layer 5B and third electrode layer 5C are not provided up to a middle portion of the effective length of the electrode of piezoelectric layer 4, that is, if the areas of second electrode layer 5B and third electrode layer 5C are too small, the piezoelectric effect becomes weak, and has a small capability to displace piezoelectric layer 4.

An optical reflection device according to the present invention may have a small size, and is useful for various electronic devices, such as a laser printer.

The invention claimed is:

1. An optical reflection device comprising:
   a flexible substrate extending in a first, longitudinal direction so as to have a first longitudinal end and a second longitudinal end longitudinally opposite to the first longitudinal end, the second longitudinal end being movable with respect to the first longitudinal end;
   a first elastic portion connected with the second longitudinal end of the flexible substrate;
   an optical reflector coupled with the flexible substrate via the first elastic portion;
   a first electrode layer provided on the flexible substrate;
   a piezoelectric layer provided on the first electrode layer; and
   a second electrode layer provided on the piezoelectric layer;
   wherein the optical reflector is arranged to swing about an axis extending in a second, lateral direction perpendicular to the first, longitudinal direction; and
   wherein the first elastic portion has a zigzag shape that proceeds in the second, lateral direction from the second longitudinal end of the flexible substrate to the optical reflector so as to connect laterally between the second longitudinal end of the flexible substrate and the optical reflector, the zigzag shape of the first elastic portion including plural longitudinally-extending portions extending toward the first longitudinal end of the flexible substrate.

2. The optical reflection device of claim 1, wherein the first elastic portion is thinner than the optical reflector.

3. The optical reflection device of claim 1, wherein a width of a side of the second electrode layer approximating to the first longitudinal end of the flexible substrate is larger than a width of a side of the second electrode layer approximating to the second longitudinal end of the flexible substrate.

4. The optical reflection device of claim 1, wherein the second electrode layer faces the first electrode layer across the piezoelectric layer.

5. The optical reflection device of claim 1, wherein
   said longitudinally-extending portions of said first elastic portion are connected together by first end portions; and
   a width of each of the first end portions of the first elastic portion in the second, lateral direction is shorter than a width of each of the first end portions of the first elastic portion in the first, longitudinal direction.

6. The optical reflection device of claim 1, wherein
   the first electrode layer extends onto the first elastic portion, and
   the second electrode layer faces the first elastic portion across the piezoelectric layer and the first electrode layer.

7. The optical reflection device of claim 1, further comprising:
   a second elastic portion connected with the second longitudinal end of the flexible substrate;
   wherein the second electrode layer is provided on a first portion of the piezoelectric layer;
   wherein a third electrode layer is provided on a second portion of the piezoelectric layer that is different than the first portion of the piezoelectric layer; and
   wherein the optical reflector is coupled with the second longitudinal end of the flexible substrate via the second elastic portion.

8. The optical reflection device of claim 7, wherein
   the optical reflector has a center line extending in the first, longitudinal direction,
   the second electrode layer and the third electrode layer are located at positions symmetrical to each other with respect to the center line and have shapes symmetrical to each other with respect to the center line.

9. The optical reflection device of claim 8, wherein the first elastic portion and the second elastic portion are located at positions symmetrical to each other with respect to the center line and have shapes symmetrical to each other with respect to the center line.

10. The optical reflection device of claim 7, wherein
    the second elastic portion has a zigzag shape from the second longitudinal end of the flexible substrate and returning at the first longitudinal end, the zigzag shape proceeding toward the optical reflector in the second lateral direction perpendicular to the first, longitudinal direction;
    said zigzag shape of said second elastic portion includes longitudinally-extending portions connected together by second end portions; and
    a width of each of the second end portions of the second elastic portion in the second, lateral direction is shorter than a width of each of the second end portions of the second elastic portion in the first, longitudinal direction.

11. The optical reflection device of claim 7, wherein
    the first electrode layer extends onto the first elastic portion, and
    the third electrode layer faces the second elastic portion via the piezoelectric layer and the first electrode layer.

12. The optical reflection device of claim 1, wherein
the optical reflector extends in the first, longitudinal direction so as to have a first longitudinal end and a second longitudinal end longitudinally opposite the first longitudinal end; and the first elastic portion connects laterally between the second longitudinal end of the optical reflector and the second longitudinal end of the flexible substrate.

* * * * *